(No Model.)
E. THOMSON.
ELECTRIC WELDING.
No. 347,142. Patented Aug. 10, 1886.
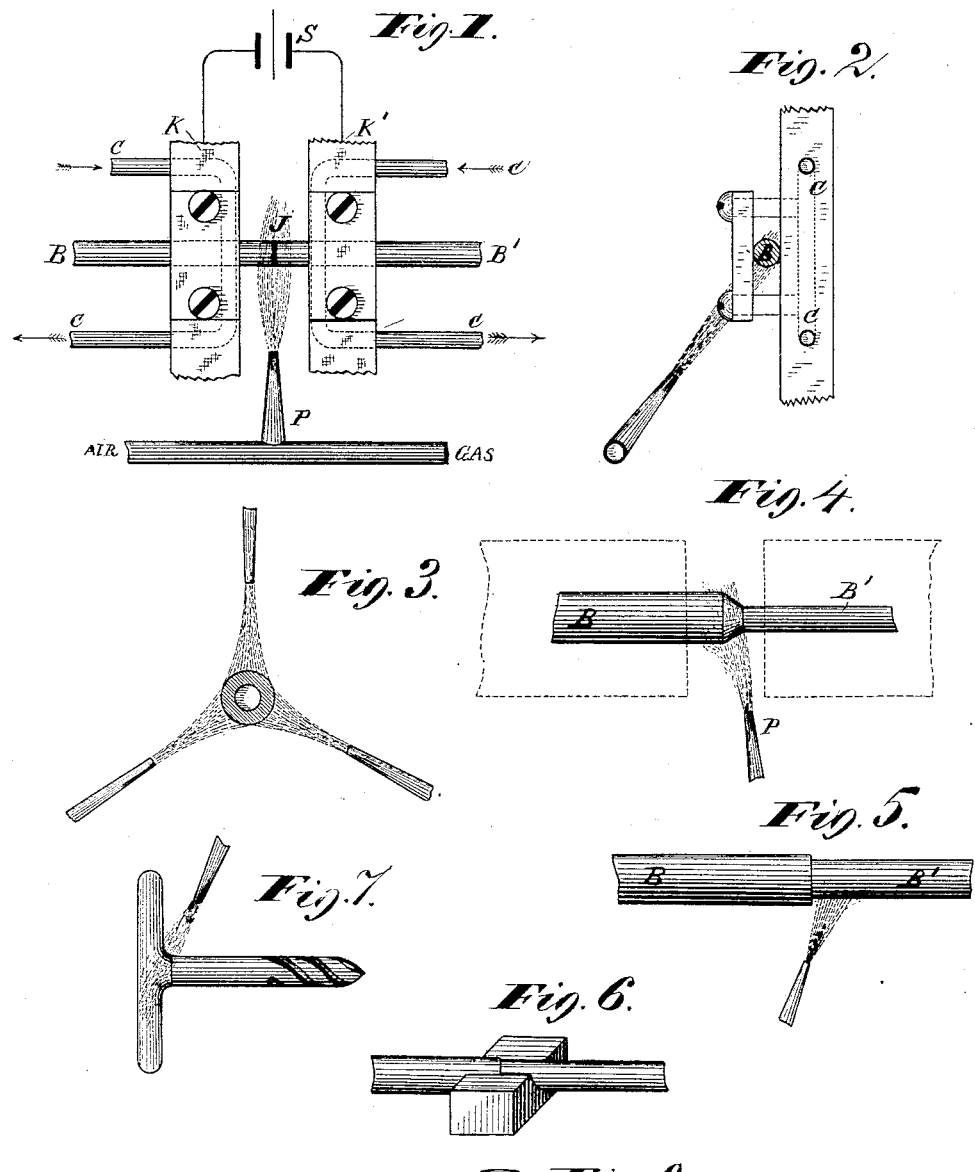
WITNESSES:
INVENTOR
Elihu Thomson
BY
H. C. Townsend
ATTORNEY

UNITED STATES PATENT OFFICE.

ELIHU THOMSON, OF LYNN, MASSACHUSETTS.

ELECTRIC WELDING.

SPECIFICATION forming part of Letters Patent No. 347,142, dated August 10, 1886.

Application filed May 21, 1886. Serial No. 202,841. (No model.)

*To all whom it may concern:*

Be it known that I, ELIHU THOMSON, a citizen of the United States, and a resident of Lynn, in the county of Essex and State of Massachusetts, have invented certain new and useful Improvements in Electric Welding, of which the following is a specification.

My invention relates to certain improvements in the art of electric welding, an art or process of and apparatus for which have been described by me in prior applications for Letters Patent filed March 29, 1886.

My present improvements have for their object the enlarging of the scope of my aforesaid method, whereby welding or union by heat is effected between bars, tubes, &c., of cast-iron, steel, wrought-iron, copper, brass, German silver, &c., or between cast-iron and steel, or soft iron, steel and soft iron, copper and iron, copper and brass, &c., by the passage of heavy currents of electricity across the proposed junction while the pieces are forced together by pressure, with the application, if needed, of a suitable flux, such as borax, to the junction.

My present invention assists in working with large pieces especially where the source of current would otherwise have been insufficient; and it consists in applying, in conjunction with the electric current used, as in my former invention, an external source of heat, such as that from a blow-pipe flame, one or more.

My invention also provides for cooling the clamps whereby the pieces to be welded are held, and whereby the current is conveyed to such pieces; and it consists of a clamp constructed to permit the circulation of air or water through it or in contact with it.

My invention consists, also, in other details which will presently appear in the description following.

Figure 1 is a plan of an apparatus by which my invention may be carried out. Fig. 2 is a side view of the same. Fig. 3 illustrates a modification of the invention. Figs. 4, 5, 6, 7, and 8 illustrate modifications in the details of the operation.

In Fig. 1 are indicated by K K' portions of the clamps for holding the pieces B B'—for example, steel bars to be welded by abutment together with pressure. S indicates any source of electric current fed to the clamps, and P a blow-pipe for applying flame to the junction J while under treatment. The application of the flame to the pieces at their abutting portions J tends to add to the heat by preventing loss by convection, and the gases of the flame check oxidation. With several blow-pipe flames concentrated on the junction, as indicated at Fig. 3, much more massive pieces can be joined with a given source of current than without.

In Figs. 1 and 2 pipes are shown at C C C C for supplying cooling-fluid, as water, to the clamp-pieces K K' when of large size, and in which case they may be made with internal passages for cooling and circulation of fluid. This will be advantageous in dealing with large masses to be welded and when the metal pieces are good conductors of heat, as when they are of copper tube or bar.

Where the pieces to be joined are of unequal size, as indicated in Fig. 4, it is best to cause the larger piece to project farther from the clamps than the other and to apply the flame only to the larger, assuming the pieces to be of the same metal or of equal electrical resistance per unit of section and equal fusibility. When, however, one piece, as B, is of metal of high specific resistance, and B' is of low specific resistance and nearly of equal or of quite equal diameter, the flame should heat the one having the least resistance, as indicated in Fig. 5, and it should be allowed to project farther from the clamping-surfaces to prevent conduction of heat away from it. In certain cases the clamps themselves may be kept heated to lessen loss of heat by conduction.

As indicated in Fig. 6, the joint may be protected during formation by a non conducting mold of fire-clay or hard carbon.

In joining together irregular forms, as, for example, putting a malleable-iron handle on a tool of steel, the more massive pieces should receive the blow-pipe flame, as indicated in Fig. 7.

In Fig. 8 is shown the usual form of the joint after welding by the current. If the bars are of considerable size, the joint may be hammered while still in place and while still heated by the current, so improving its density and tenacity as well as reducing it slightly.

What I claim as my invention is—

1. The herein-described improvement in electric welding, consisting in applying heat from an external source to the parts to be joined at or near the welding-junction simultaneously with the flow of the electric current.

2. The herein-described improvement in electric welding, consisting in condensing the welding-junction by hammering simultaneously with the heating of the parts by the electric current.

3. The combination, with the clamps for holding metal pieces for welding by electric currents, of means, such as pipes and passages, for circulation of cooling-fluid for cooling said clamps.

Signed at Lynn, in the county of Essex and State of Massachusetts, this 18th day of May, A. D. 1886.

ELIHU THOMSON.

Witnesses:
W. O. WAKEFIELD,
E. H. KITFIELD.